United States Patent
Yang et al.

(10) Patent No.: US 9,825,439 B2
(45) Date of Patent: Nov. 21, 2017

(54) WITHDRAWABLE INTERLOCK DEVICE OF VACUUM CIRCUIT BREAKER

(71) Applicant: LSIS CO., LTD., Anyang-si, Gyeonggi-do (KR)

(72) Inventors: Hong Ik Yang, Cheongju-si (KR); Han Joo Lee, Cheongju-si (KR); Jun Youn Jo, Daejeon (KR); Kil Young Ahn, Daejeon (KR)

(73) Assignee: LSIS CO., LTD., Anyang-si (KR)

( * ) Notice: Subject to any disclaimer, the term of this patent is extended or adjusted under 35 U.S.C. 154(b) by 190 days.

(21) Appl. No.: 14/749,400

(22) Filed: Jun. 24, 2015

(65) Prior Publication Data
US 2016/0156164 A1 Jun. 2, 2016

(30) Foreign Application Priority Data
Nov. 28, 2014 (KR) .......................... 10-2014-0168947

(51) Int. Cl.
*H01H 9/20* (2006.01)
*H01H 9/24* (2006.01)
(Continued)

(52) U.S. Cl.
CPC ........... *H02B 11/133* (2013.01); *H01H 33/46* (2013.01); *H01H 33/66* (2013.01)

(58) Field of Classification Search
CPC .......... H01H 33/46; H01H 33/66; H01H 9/20; H01H 1/12; H01H 1/2058; H01H 3/00; H01H 3/02; H01H 3/04; H01H 9/24; H01H 71/10; H01H 71/1054; H01H 71/12; H01H 71/121; H01H 71/126; H01H 71/52; H01H 71/62; H01H 71/64; H01H 73/06;
(Continued)

(56) References Cited

U.S. PATENT DOCUMENTS

| 5,206,468 A | 4/1993 | Kobayashi et al. |
| 2011/0233034 A1* | 9/2011 | Park ..................... H02B 11/133 200/50.27 |

FOREIGN PATENT DOCUMENTS

| CN | 201435546 | 3/2010 |
| CN | 102117719 | 7/2011 |

(Continued)

OTHER PUBLICATIONS

Korean Intellectual Property Office Application Serial No. 10-2014-0168947, Office Action dated Mar. 16, 2016, 4 pages.
(Continued)

*Primary Examiner* — Anthony R. Jimenez
(74) *Attorney, Agent, or Firm* — Lee Hong Degerman Kang & Waimey

(57) ABSTRACT

As described above, a withdrawable interlock device of a vacuum circuit breaker according to the present disclosure may locate the second lever between the link and the moving plate, and thus the second lever may be engaged with an outer side of the first lever in a state that the control power connector is coupled to the control power plug not to move the moving plate through the second lever so as to maintain a state that the fitting protrusion is fitted into the fitting groove, thereby having an effect of preventing the circuit breaker body from being separated to the outside of the cradle in a state that the control power connector is coupled to the control power plug to supply power.

11 Claims, 13 Drawing Sheets

(51) Int. Cl.
*H01H 33/42* (2006.01)
*H02B 11/133* (2006.01)
*H01H 33/46* (2006.01)
*H01H 33/66* (2006.01)

(58) Field of Classification Search
CPC ........ H01H 73/22; H01H 73/36; H01H 73/60;
H01H 2003/00; H01H 2003/02; H01H
2003/161; H02B 11/133; H02B 11/10
USPC ............. 200/43.02, 401, 51 R, 51.02, 51.09,
200/51.11, 19.3, 43.08, 43.11, 43.16,
200/50.02, 322–325, 327, 329; 74/470
See application file for complete search history.

(56) References Cited

FOREIGN PATENT DOCUMENTS

| | | |
|---|---|---|
| EP | 2341590 | 7/2011 |
| EP | 2369702 | 11/2012 |
| JP | 62-101318 | 6/1987 |
| JP | 4698741 | 6/2011 |
| KR | 10-2011-0106737 | 9/2011 |

OTHER PUBLICATIONS

European Patent Office Application Serial No. 15173614.7, Search Report dated Apr. 11, 2016, 9 pages.
The State Intellectual Property Office of the People's Republic of China Application No. 201510472972.5 Office Action dated Apr. 26, 2017, 5 pages.

* cited by examiner

WITHDRAWABLE INTERLOCK DEVICE OF VACUUM CIRCUIT BREAKER

CROSS-REFERENCE TO RELATED APPLICATIONS

Pursuant to 35 U.S.C. §119(a), this application claims the benefit of earlier filing date and right of priority to Korean Patent Application No. 10-2014-0168947, filed on Nov. 28, 2014, the contents of which are hereby incorporated by reference herein in its entirety.

BACKGROUND OF THE INVENTION

1. Field of the Invention

The present invention relates to a withdrawable interlock device of a vacuum circuit breaker, and more particularly, to a withdrawable interlock device of a vacuum circuit breaker for controlling the withdrawal of a circuit breaker body according to whether or not a control power plug is coupled to a control power connector.

2. Description of the Related Art

In general, a circuit breaker is an electrical protection device for protecting a load device or line from a fault current when an accident occurs such as a short circuit, a ground fault or the like generated from an electrical circuit.

Such a circuit breaker may be divided into an oil circuit breaker using an oil as an extinguishing medium, a gas circuit breaker using sulphur hexafluoride ($SR_6$) gas which is an inert gas, an air circuit breaker using the air as an extinguishing medium, a circuit breaker using magnetic attraction, a vacuum circuit breaker using the dielectric strength of the vacuum, and the like, according to the extinguishing medium.

In recent years, most power device products have used sulphur hexafluoride gas having an excellent arc-extinguishing and insulation performance as an insulation medium, but the use of sulphur hexafluoride gas has been regulated throughout the world since its greenhouse effect is 23,900 times higher than that of carbon dioxide.

The development of eco-friendly power device products that would be able to replace sulphur hexafluoride gas have been actively carried out in the domestic market, and as one of the eco-friendly power device products, the demand of vacuum circuit breakers has been increased.

The vacuum circuit breaker takes mostly charge of the role of power transfer control and power system protection, and has a large breaking capacity and high reliability and stability as well as is able to be mounted even in a small installation space, and thus its application range has been extended from medium voltage to high voltage.

Here, the vacuum circuit breaker may be installed along with a switchgear in which various electrical devices including a circuit breaker are placed and managed for the operation or control of a power plant, a substation and the like, the operation of a motor or the like, and accommodated and used within a cradle fixed to the switchboard.

The vacuum circuit breaker may be divided into a fixed type and a withdrawable type, and the withdrawable circuit breaker may be divided into a disconnecting position at which both the main circuit and control circuit of the vacuum circuit breaker are separated therefrom, a test position at which the main circuit is separated therefrom but the control circuit is connected thereto, and a connecting position at which both the main circuit and control circuit are connected thereto, according to the extent of the vacuum circuit breaker being withdrawn into or from the cradle.

Here, the circuit breaker body receives an electrical signal while moving to the connecting position from the test position to be turned on or off, wherein a control power plug is provided in the circuit breaker body, and a control power connector is provided within a switchboard provided with the circuit breaker body, and thus control power is applied to or blocked from the circuit breaker body according to whether or not the control power plug is coupled to the control power connector.

On the other hand, FIG. 1 is a perspective view illustrating a circuit breaker body, and FIG. 2 is a schematic diagram illustrating a circuit breaker body located within the cradle prior to being withdrawn into the switchboard in a state that the control power plug is separated from the control power connector, and FIG. 3 is a schematic diagram illustrating a state in which a circuit breaker body located within the cradle is withdrawn into the switchboard in a state that the control power plug is coupled to the control power connector, and FIG. 4 is a perspective view illustrating a carriage for moving a circuit breaker body within the cradle.

As illustrated in FIGS. 1 through 4, a vacuum circuit breaker in the related art may include a switchboard 40, a cradle 30 inserted into the switchboard 40, a circuit breaker body 10 moving within the cradle 30, a carriage 20 on which the circuit breaker body 10 is mounted to move within the cradle 30, and the like.

A control power plug 41 configured to provide power is provided within the switchboard 40, and a control power connector 11 detachably connected to the control power plug 41 is provided in the circuit breaker body 10.

According to the foregoing configuration, when the circuit breaker body 10 moves to a connecting position from a test position while moving within the cradle 30 in a state that the circuit breaker body 10 is mounted on the carriage 20, the control power plug 41 and control power connector 11 moves to a connecting position in a state that they are connected to each other.

Here, a load terminal and a busbar terminal provided in the circuit breaker body 10 may be connected to a terminal of the cradle 30 while the circuit breaker body 10 moves within the cradle 30 through the carriage 20, thereby completing the movement to a connecting position.

However, according to a vacuum circuit breaker having the foregoing configuration in the related art, the circuit breaker body 10 may be separated from the outside of the switchboard 40 in a state that control power is supplied to the circuit breaker body 10 without any additional configuration for preventing the circuit breaker body 10 from being separated out of the switchboard 40 from a test position at which the control power connector 11 is coupled to the control power plug 41, thereby resulting in the occurrence of an accident for the operator or the damage of the vacuum circuit breaker.

SUMMARY OF THE INVENTION

The present invention is contrived to solve the foregoing problem, and an aspect of the present invention is to provide a withdrawable device of a vacuum circuit breaker for controlling the withdrawal of a circuit breaker body according to whether or not a control power plug is coupled to a control power connector.

The foregoing aspect of the present disclosure may be accomplished by providing a withdrawable interlock device of a vacuum circuit breaker including a switchboard provided with a control power plug; a circuit breaker body provided with a control power connector detachably connected to the control power plug; a cradle inserted into the switchboard and a carriage moving within the cradle in a state that the circuit breaker body is mounted thereon, wherein the withdrawable interlock device includes a link configured to move according to whether the control power plug is attached to or detached from the control power connector; a link connector connected to the link to move in linkage with the movement of the link; a first lever connected to the link connector to rotate by a predetermined angle according to the movement of the link connector; a moving plate provided in the carriage to move; and a second lever located between the link and the moving plate, and one side of which is located close to the first lever according to the rotation by a predetermined angle to limit the rotation of the first lever or the other side of which pushes the moving plate while at the same time releasing the close location between the one side and the first lever.

Furthermore, a base frame on which the circuit breaker body moves may be provided in the cradle, and a lateral plate formed with a fitting groove may be provided at both sides of the base frame, and a fitting protrusion may be formed at one side of the moving plate, and thus the moving plate may move to fit the fitting protrusion into the fitting groove when the second lever rotates to release the close location between one side of the second level and the first lever, and the moving plate may move to separate the fitting protrusion from the fitting groove when the second lever rotates to allow one side of the second lever to be close to the first lever.

Furthermore, a moving control stopper may be provided on an inner surface of the moving plate to rotate in a state that the other side of an inner surface of the second lever is in close contact with the moving control stopper and push the moving control stopper so as to move the moving plate.

Furthermore, a rotating member may be provided at an upper side of the moving plate, and the rotating member may be formed with a horizontal plate and a vertical plate perpendicular to the horizontal plate, and the vertical plate may be located in close contact with the other side of an outer surface of the second lever to rotate the rotating member in a state that the vertical plate is in close contact with the second lever so as to move the moving plate while at the same time rotating the second lever.

Furthermore, a handle portion may be further formed at one side of the horizontal plate.

Furthermore, a fixed plate may be provided in the proximity of the first lever, and a moving groove may be formed on the fixed plate to rotate the second lever in a state that the second lever is fitted into the moving groove.

Furthermore, a rotating control plate located in contact with the first lever to limit the rotation of the second lever in a state that the first lever is rotated may be further formed on one side of an upper surface of the second lever.

Furthermore, the link connector may include an upper plate formed in a vertical direction to be connected to a lower portion of the link, a middle plate extended to the upper plate to be bent in a horizontal direction, and a lower plate extended to the middle plate to be bent in a vertical direction and formed with a rotating control groove, and the first lever may include a front plate and a lateral plate formed perpendicular to a lateral surface of the front plate, and a fastening member may pass through the rotating control groove in a state that the lateral plate is in close contact with an inner surface of the lower plate to rotate the first lever along the movement of the link connector in a state that the first lever is connected to the link connector.

Furthermore, the rotating control groove may be formed such that a transverse diameter thereof is greater than a longitudinal diameter thereof.

Furthermore, a first lever supporting member located in close contact with the lateral plate may be provided adjacent to the lower plate, and a through hole may be formed on the first lever supporting member, and an aperture may be formed on the lateral plate at a position corresponding to the through hole, and a fastening member may pass through the through hole and the aperture in a state that the first lever supporting member is in close contact with the lateral plate to rotate the first lever in a state that the first lever supporting member is fixed to the lateral plate.

Furthermore, an elastic member may be provided within the cradle to be separated from the second lever by a predetermined distance, and an elastic member connecting plate may be formed on the other side of an outer surface of the second lever to be connected to the elastic member, and when the second lever rotates along the rotation of the rotating member the second lever may receive an elastic restoring force to a position prior to being rotated through the elastic member while at the same time releasing the close location between the second lever and the first lever.

As described above, a withdrawable interlock device of a vacuum circuit breaker according to the present disclosure may locate the second lever between the link and the moving plate, and thus the second lever may be engaged with an outer side of the first lever in a state that the control power connector is coupled to the control power plug not to move the moving plate through the second lever so as to maintain a state that the fitting protrusion is fitted into the fitting groove, thereby having an effect of preventing the circuit breaker body from being separated to the outside of the cradle in a state that the control power connector is coupled to the control power plug to supply power.

Furthermore, engagement between the first lever and the second lever may be released and the moving plate moving in interlock with the second lever may be also moved in a state that the control power connector is separated from the control power plug, and thus the moving plate may be allowed to move to separate the fitting protrusion from the fitting groove in a state that the control power connector is separated from the control power plug to block the application of control power, thereby having an effect of easily separating the circuit breaker body from an inside of the cradle.

Furthermore, the circuit breaker body may not be allowed to be separated to an outside of the switchboard, thereby preventing an accident for the operator from being occurred as well as preventing the vacuum circuit breaker from being broken due to its electrical damage.

Furthermore, an additional rotating member may be provided to control the movement of the moving plate through the rotating member to easily control the movement of the moving plate, and the handle portion may be provided on the rotating member, thereby allowing the user to easily manipulate the rotating member.

Furthermore, the moving control stopper may be provided on an inner surface of the moving plate, and the second lever may be in close contact with the moving control stopper while the rotating member is in close contact with the second lever, thereby having an effect of moving the second lever and the moving plate in an interlocking manner with each other according to the rotation of the rotating member.

Furthermore, the fixed plate formed with a moving groove may be provided therein, and rotated in a state that the second lever is fitted into the moving groove, thereby having an effect of rotating the second lever in a predetermined direction in a state that the second lever is securely fixed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, an interlock device of a vacuum circuit breaker according to an embodiment of the present disclosure will be described in detail with reference to the accompanying drawings.

Figure 1:
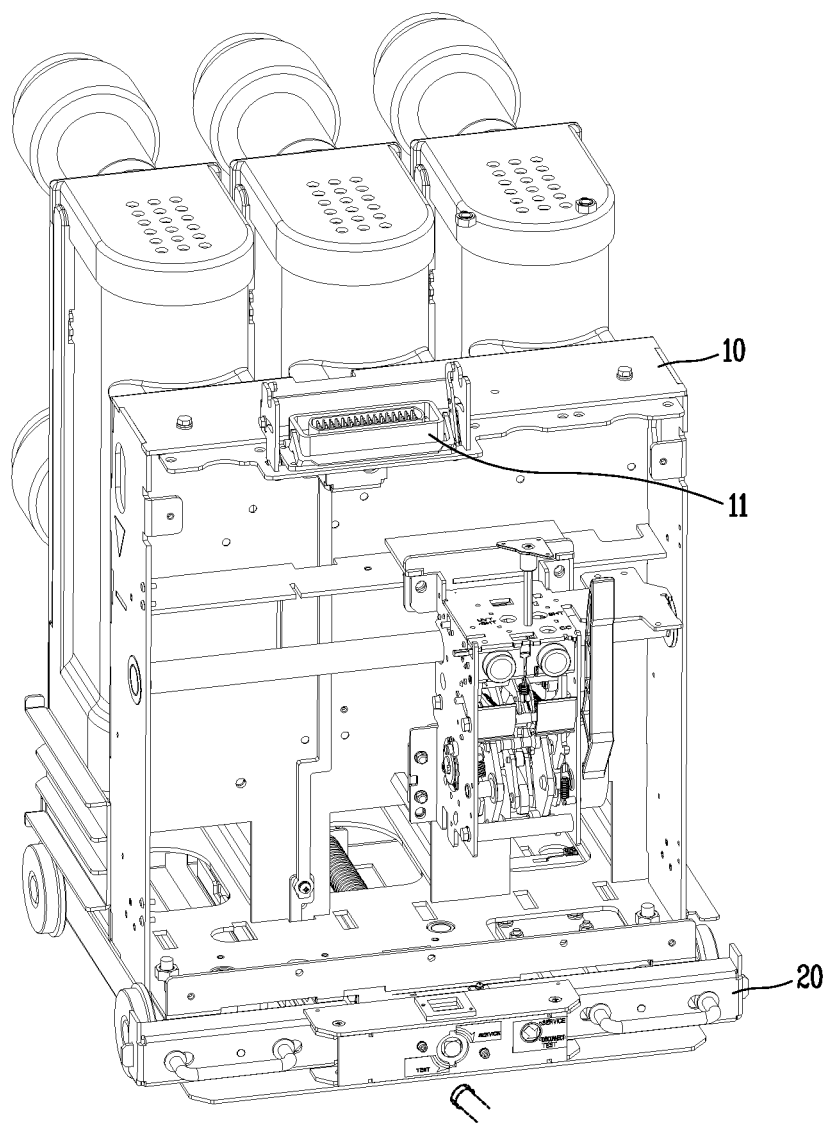
FIG. 1 is a perspective view illustrating a circuit breaker body.
Figure 2:
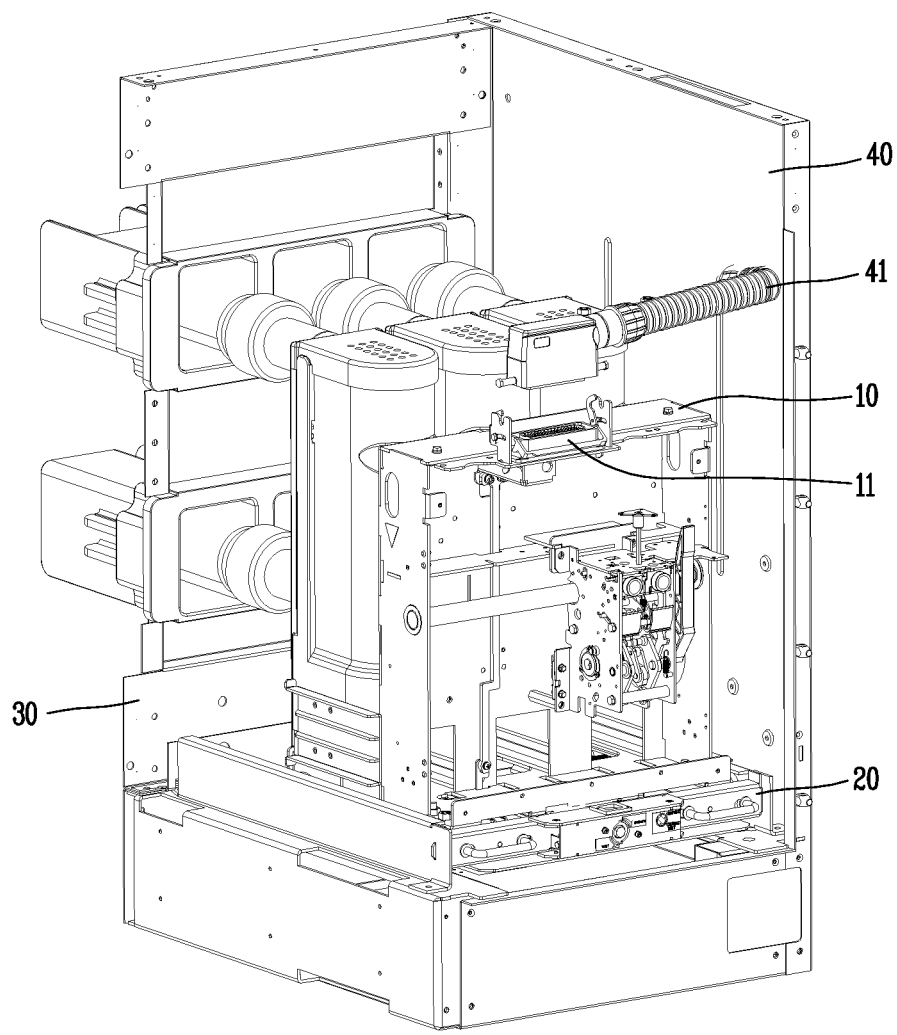
FIG. 2 is a schematic diagram illustrating a circuit breaker body located within the cradle prior to being withdrawn into the switchboard in a state that the control power plug is separated from the control power connector.
Figure 3:
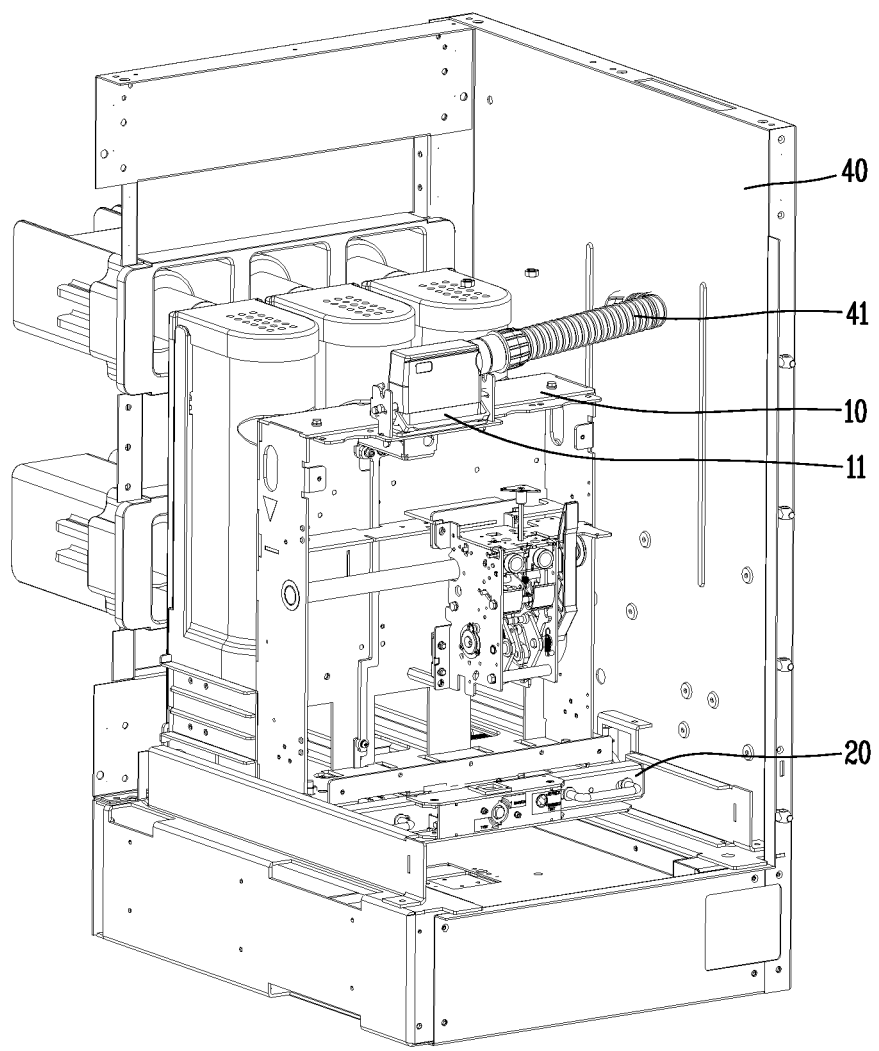
FIG. 3 is a schematic diagram illustrating a state in which a circuit breaker body located within the cradle is withdrawn into the switchboard in a state that the control power plug is coupled to the control power connector.
Figure 4:
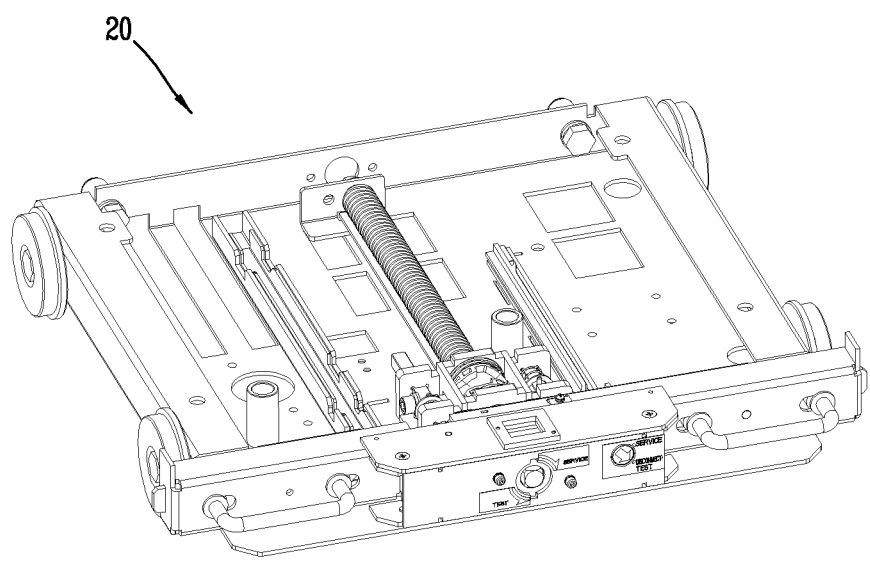
FIG. 4 is a perspective view illustrating a carriage for moving a circuit breaker body within the cradle.
Figure 5:
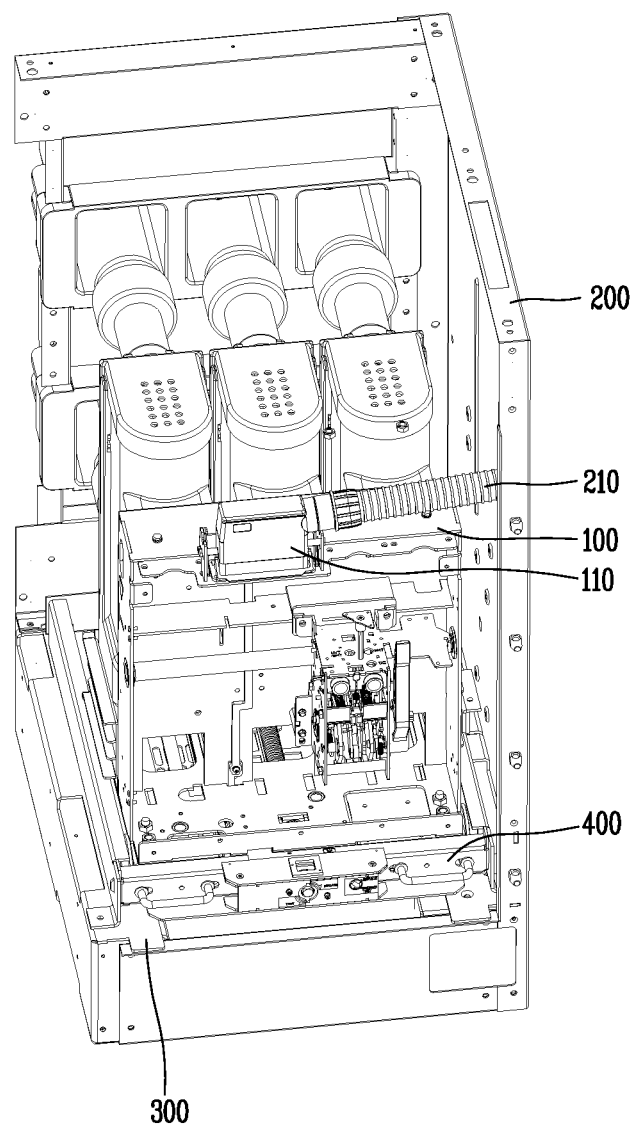
FIG. 5 is a perspective view illustrating a switchboard provided with an interlock device according to the present disclosure.
Figure 6A:
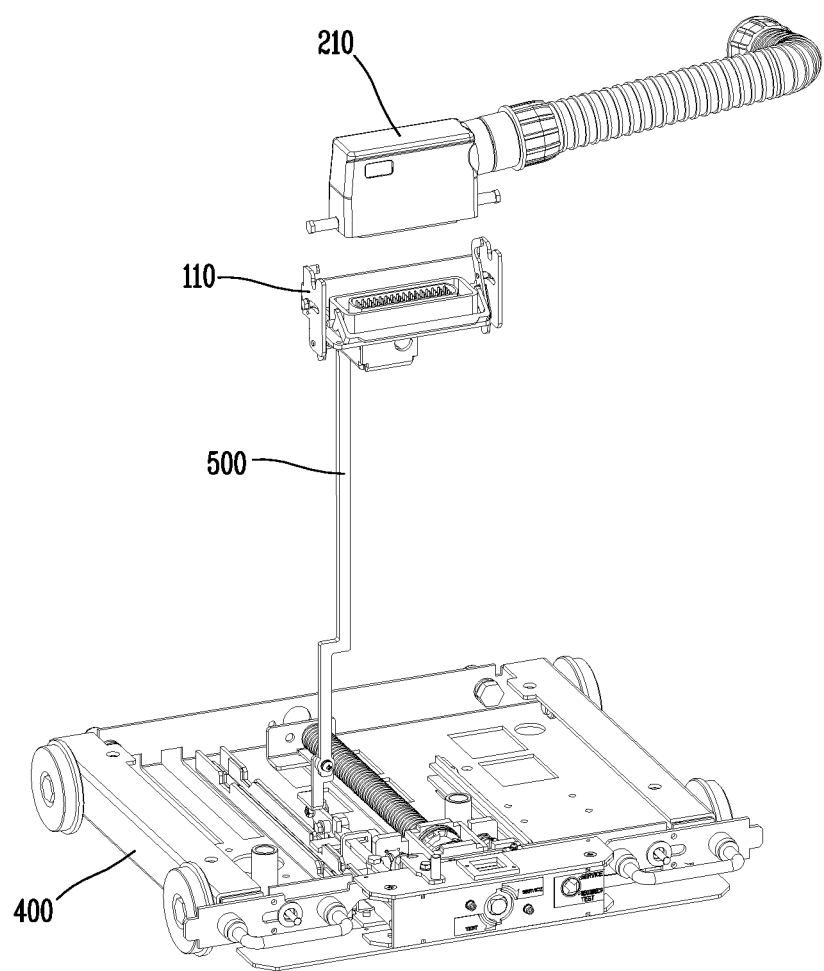
FIG. 6A is a perspective view illustrating an interlock device in a state that the control power plug is separated from the control power connector.
Figure 6B:
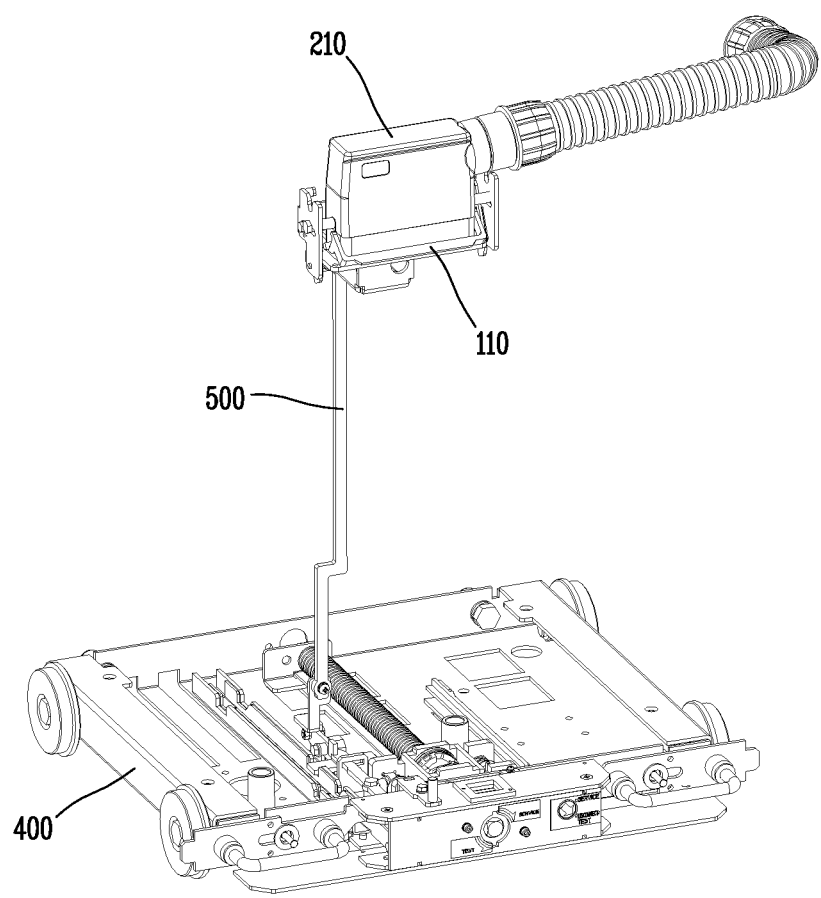
FIG. 6B is a perspective view illustrating an interlock device in a state that the control power plug is coupled to the control power connector.
Figure 7:
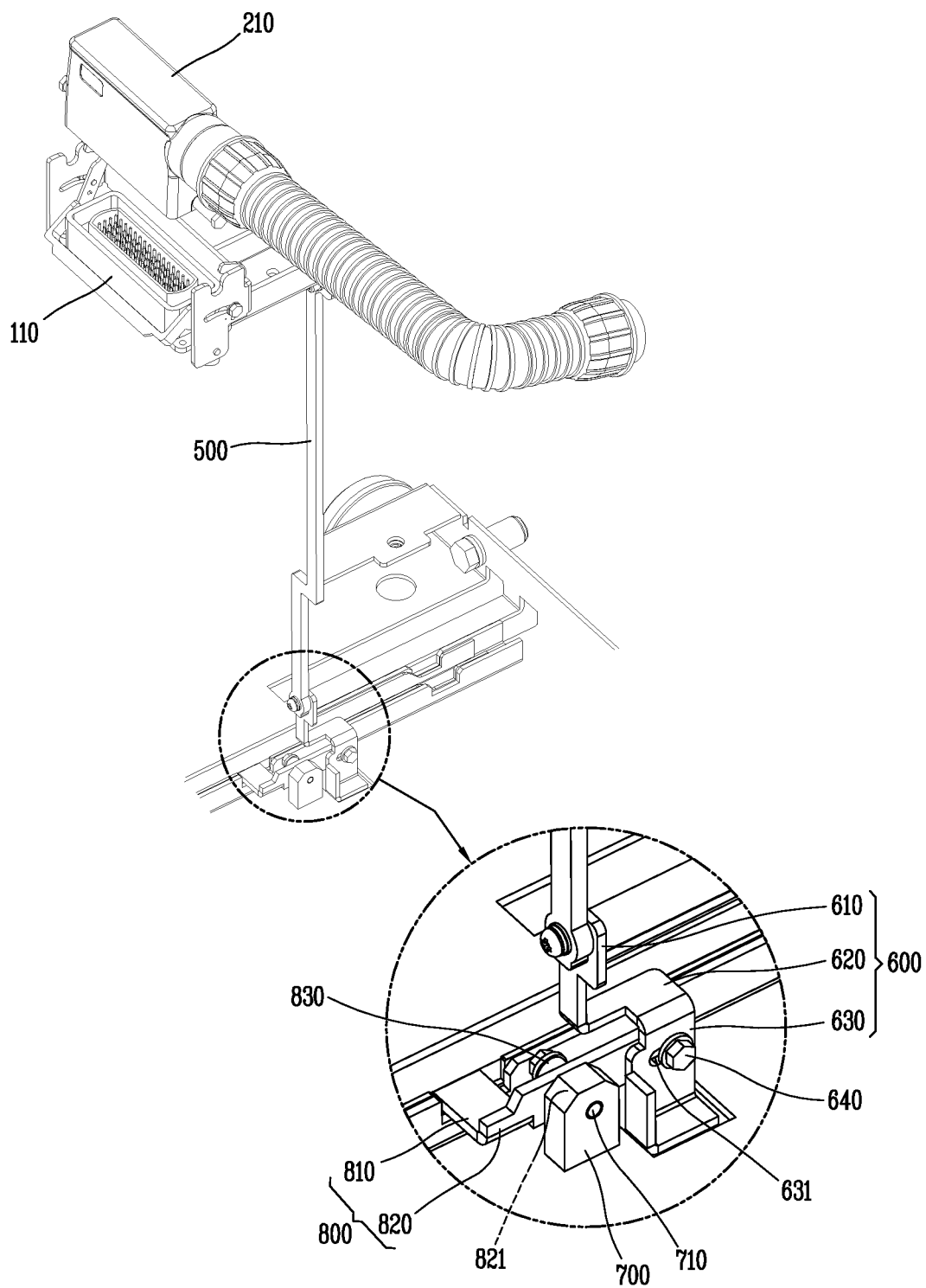
FIG. 7 is a partially enlarged view illustrating the location of the first lever in a state that the control power plug is separated from the control power connector.

FIG. 5 is a perspective view illustrating a switchboard provided with an interlock device according to the present disclosure, and FIG. 6A is a perspective view illustrating an interlock device in a state that the control power plug is separated from the control power connector, and FIG. 6B is a perspective view illustrating an interlock device in a state that the control power plug is coupled to the control power connector, and FIG. 7 is a partially enlarged view illustrating the location of the first lever in a state that the control power plug is separated from the control power connector.

Figure 8:
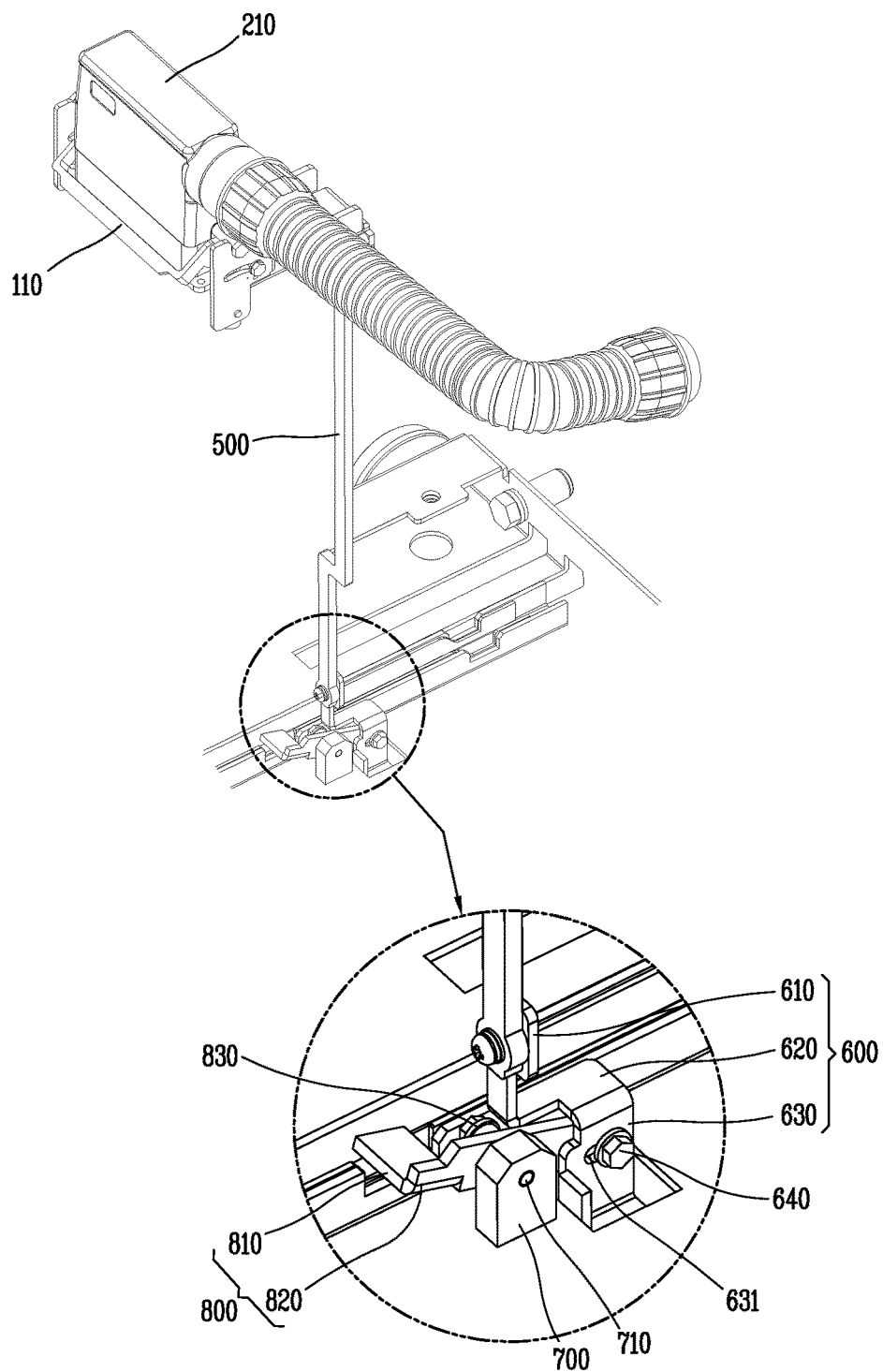
FIG. 8 is a partially enlarged view illustrating the location of the first lever in a state that the control power plug is coupled to the control power connector.
Figure 9:
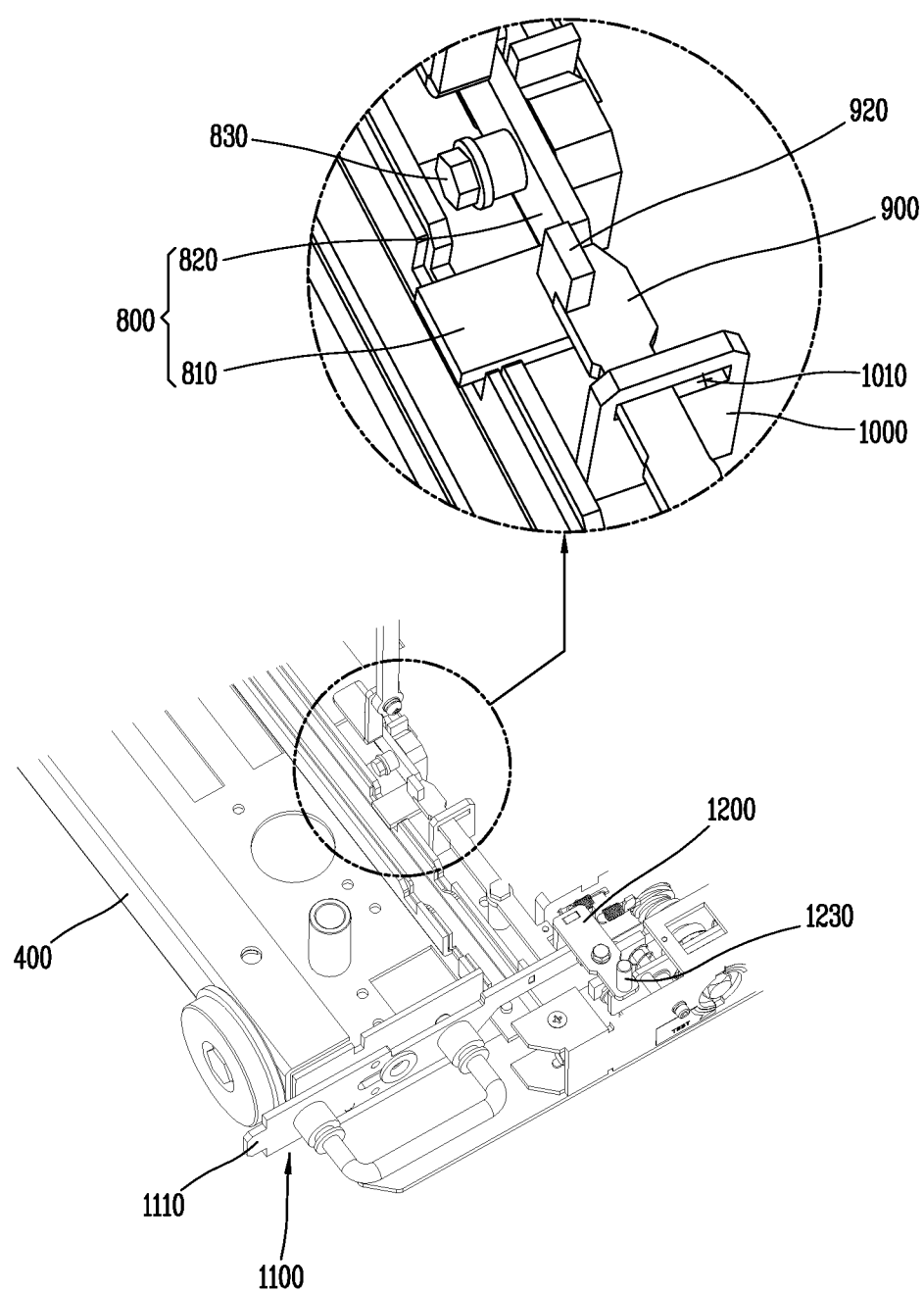
FIG. 9 is a partially enlarge view illustrating the location of the second lever prior to the moving plate being moved through the rotating member.

Furthermore, FIG. 8 is a partially enlarged view illustrating the location of the first lever in a state that the control power plug is coupled to the control power connector, and FIG. 9 is a partially enlarge view illustrating the location of the second lever prior to the moving plate being moved through the rotating member.

Figure 10:
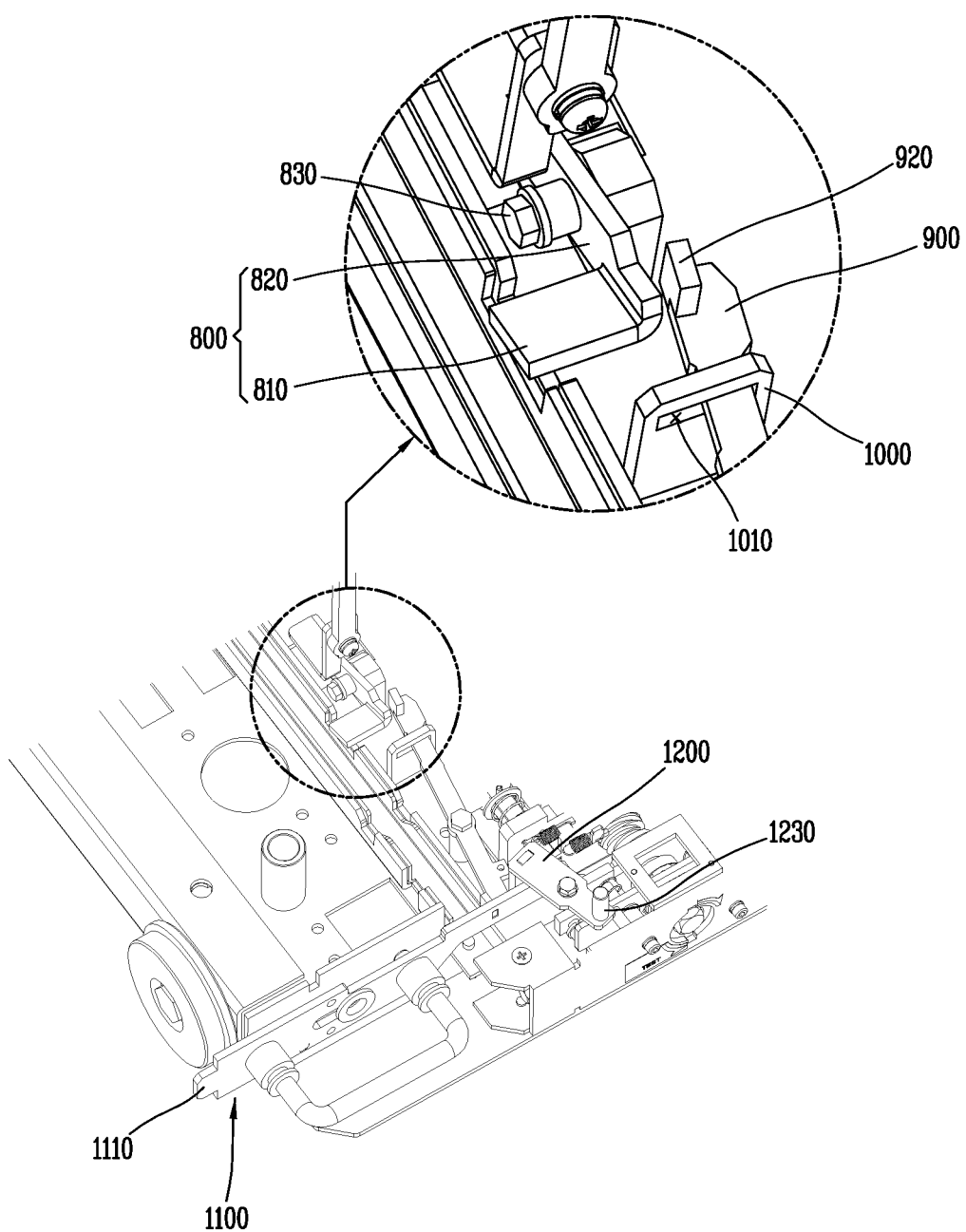
FIG. 10 is a partially enlarge view illustrating the location of the second lever in a state that the moving plate has been moved through the rotating member.
Figure 11A:
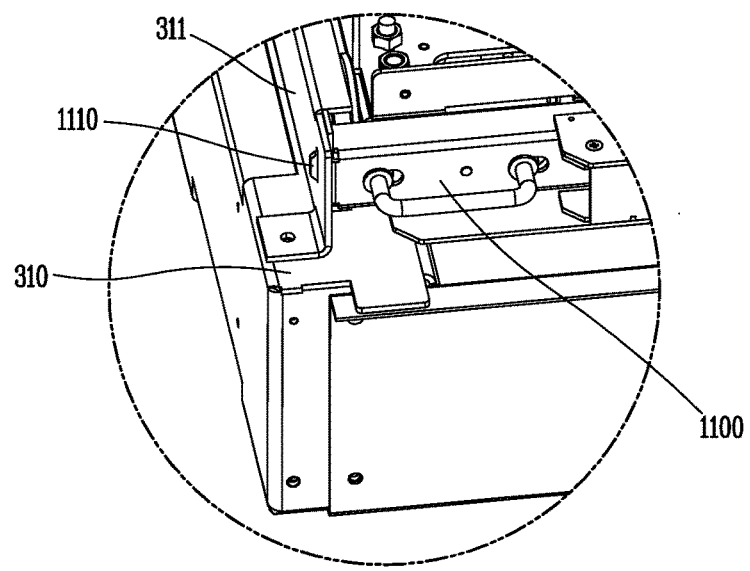
FIG. 11A is a partially enlarge view illustrating a state that the moving plate is moved through the rotating member to fit the fitting protrusion into the fitting groove.
Figure 11B:
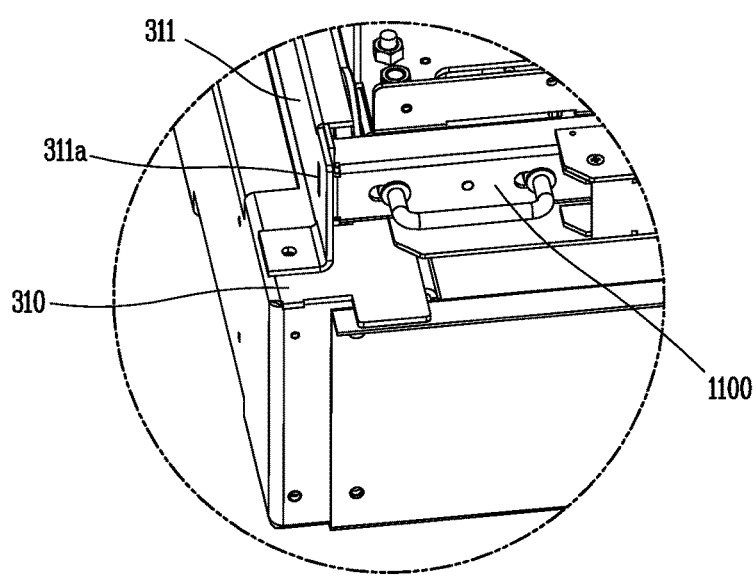
FIG. 11B is a partially enlarge view illustrating a state that the fitting protrusion is separated from the fitting groove prior to the moving plate being moved through the rotating member.
Figure 12:
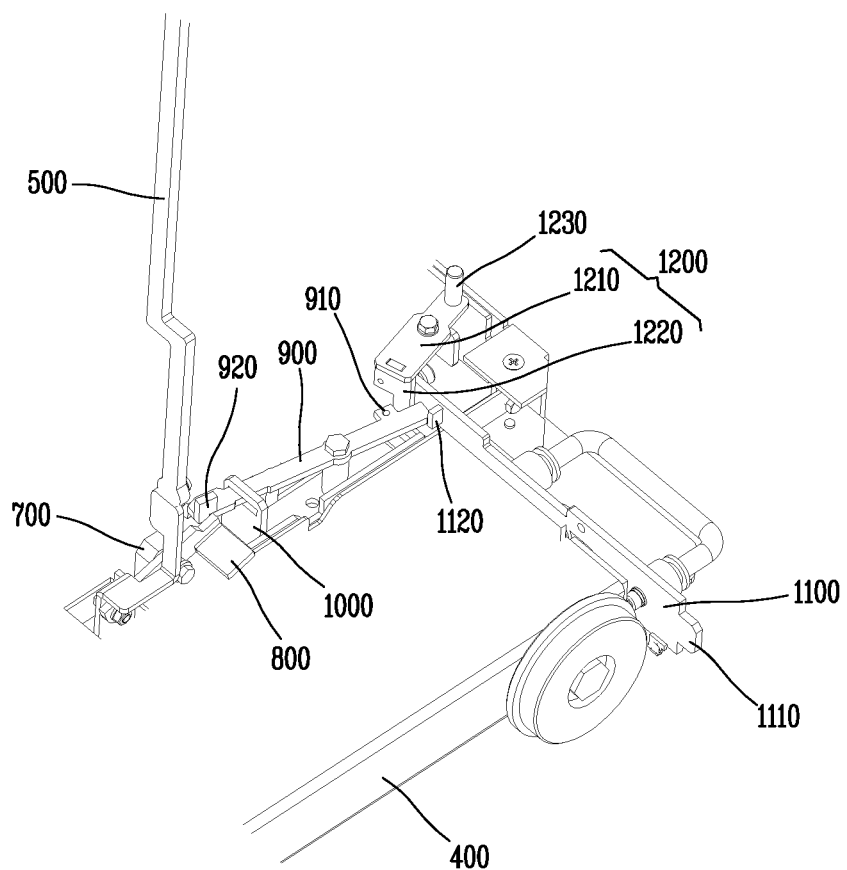
FIG. 12 is a schematic perspective view illustrating a state that the second lever is located between the link and the moving plate.

Furthermore, FIG. 10 is a partially enlarge view illustrating the location of the second lever in a state that the moving plate has been moved through the rotating member, and FIG. 11A is a partially enlarge view illustrating a state that the moving plate is moved through the rotating member to fit the fitting protrusion into the fitting groove, and FIG. 11B is a partially enlarge view illustrating a state that the fitting protrusion is separated from the fitting groove prior to the moving plate being moved through the rotating member, and FIG. 12 is a schematic perspective view illustrating a state that the second lever is located between the link and the moving plate.

As illustrated in FIG. 5, a vacuum circuit breaker according to the present disclosure is installed in a switchboard 200 in which various electrical devices are provided and managed for the operation or control of a power plant, a substation, and the like or the operation of a motor or the like.

Furthermore, a busbar terminal and a load terminal are fitted and fixed into the switchboard 200, and the circuit breaker body 100 provided with a busbar terminal and a load terminal moves to a test position and a connecting position in a state that the circuit breaker body 100 is mounted on the carriage 400 within the cradle 300 to couple the busbar terminal to the load terminal.

The control power plug 210 configured to supply control power to the vacuum circuit breaker to allow the vacuum circuit breaker to perform an on/off operation is provided in the switchboard 200, and the control power connector 110 is provided in the circuit breaker body 100 to fit the control power plug 210 thereinto.

The control power plug 210 is connected to the control power connector 110 at a test position or connecting position to supply control power to the circuit breaker body 100.

Here, there is no restrictions for allowing the test position and disconnecting position to be the same in the ANSI C37.55 standard for the location of the circuit breaker body 100 within the switchboard 200, and thus according to the present disclosure, the test position and disconnecting position of the circuit breaker body 100 may be configured to be the same, thereby allowing the circuit breaker body 100 to be separated to an outside of the switchboard 200 at the test position as well as preventing the circuit breaker body 100 from being separated to an outside of the switchboard 200 through an interlock device in a state that the control power plug 210 is connected to the control power connector 110 at the test position to supply control power.

On the other hand, as illustrated in FIGS. 7, 8 and 12, a withdrawable interlock device of a vacuum circuit breaker may be provided between the circuit breaker body 100 and the carriage 400 to limit the circuit breaker body 100 from being separated to an outside of the switchboard 200 at the test position according to whether or not the control power connector 110 is coupled to the control power plug 210, and the withdrawable interlock device may include a link 500, a link connector 600, a first lever 800, a lateral plate 311, a rotating member 1200, a moving plate 1100 and a second lever 900.

An upper portion of the link 500 is connected to the control power connector 110 to move downward when the control power plug 210 is coupled to the control power connector 110, and move upward when the control power plug 210 is separated from the control power connector 110.

The link connector 600 is rotatably connected to the link 500 to move in an upward and downward direction in linkage with the link 500 when the link 500 moves in an upward and downward direction.

Here, the link connector 600 may include an upper plate 610 formed in a vertical direction, a middle plate 620 extended to the upper plate 610 to be bent in a horizontal direction, and a lower plate 630 extended to the middle plate 620 to be bent in a vertical direction and formed with a rotating control groove 631.

A lower portion of the link 500 is connected to the upper plate 610, and the first lever 800 is located in close contact with an inner surface of the lower plate 630, and a fastening member 640 passes through the rotating control groove 631 such that the first lever 800 is closely fixed to the lower plate 630 through the fastening member 640.

Here, the rotating control groove 631 is formed such that a transverse diameter thereof is greater than a longitudinal diameter thereof, and when the link connector 600 moves in an upward and downward direction, the fastening member 640 connected to the link connector 600 moves the rotating control plate 920 along the movement of the link connector 600.

Furthermore, a first lever supporting member 700 located in close contact with the lateral plate 820 is provided in the proximity of the lower plate 630, and a through hole 710 is formed on the first lever supporting member 700, and an aperture 821 is formed on the lateral plate 820 at a position corresponding to the through hole 710, and thus the first lever supporting member 700 passes through the through hole 710 and the aperture 821 in a state that the first lever supporting member 700 is in close contact with the lateral plate 820 to rotate the first lever 800 in a state that the first lever supporting member 700 is fixed to the lateral plate 820.

The first lever 800 is located at a lower side of the link 500 and thus when the link connector 600 moves in linkage with the link 500 according to the movement of the link connector 600 in an upward and downward direction, the first lever 800 rotates by a predetermined angle in an upward and downward direction according to the movement of the link connector 600.

Here, the first lever 800 is configured with a front plate 810 and a lateral plate 820 formed to be perpendicular to a lateral surface of the 810, and rotated in an upward and downward direction along the movement of the link connector 600 in a state that the lateral plate 820 is connected to the lower plate 630 through the fastening member 830.

Furthermore, a substantially rectangular shaped fixed plate is provided in the proximity of the first lever 800, and the moving groove 1010 is formed on the fixed plate, and thus the second lever 900 rotates in a predetermined direction in a state that the second lever 900 is fitted into the moving groove 1010.

The lateral plate 311 is formed to be bent at both sides of the base frame 310 of the cradle 300, and a fitting groove 311a is formed to fit a fitting protrusion 1110 of the moving plate 1100 which will be described later to one side thereof so as to guide movement direction when the circuit breaker body 100 moves within the cradle 300.

The rotating member 1200 is located at an upper side of the moving plate 1100 to rotate by a predetermined angle according to the user's manipulation, thereby moving the moving plate 1100 while at the same time rotating the second lever 900.

Here, the rotating member 1200 is formed with a horizontal plate 1210 and a vertical plate 1220 perpendicular to the horizontal plate 1210, and a handle portion 1230 is formed on the horizontal plate 1210 to rotate the rotating member 1200 in a state the user holds the handle portion 1230.

Furthermore, the vertical plate 1220 pushes the second lever 900 in a state that the vertical plate 1220 is in close contact with the other side of an outer surface of the second lever 900 to rotate the second lever 900.

The moving plate 1100 is provided in the carriage 400, and the fitting protrusion 1110 is formed at one side thereof, and the moving plate 1100 moves according to the rotation of the rotating member 1200 to fit the fitting protrusion 1110 into the fitting groove 311a formed on the lateral plate 311 or release the fitting.

Here, a moving control stopper 1120 is provided on an inner surface of the moving plate 1100 to be protruded in an inward, and the other side of an inner surface of the second lever 900 is located in close contact with the moving control stopper 1120, and when the second lever 900 rotates through the rotating member 1200, the second lever 900 pushes the moving control stopper 1120 to move the moving plate 1100 so as to fit the fitting protrusion 1110 into the fitting groove 311a.

The second lever 900 is located between the link 500 and the moving plate 1100 to rotate by a predetermined angle according to the rotation of the rotating member 1200 so as to allow one side thereof to be located adjacent to an upper surface of the first lever 800 or allow the other side thereof to push the moving control stopper 1120 while at the same time releasing the close location to the upper surface of the first lever 800 to move the moving plate 1100.

Here, a rotating control plate 920 located in contact with the first lever 800 to limit the rotation of the second lever 900 in a state that the first lever 800 is rotated is further formed on one side of an upper surface of the second lever 900.

Accordingly, the rotating control plate 920 is located in contact with an outer surface of the first lever 800 in a state that the second lever 900 is rotated, thereby resulting in a state that it is unable to be restored to a position prior to the second lever 900 being rotated by the first lever 800.

Furthermore, an elastic member connecting plate 910 is formed on the other side of an outer surface of the second lever 900, and an elastic member (not shown) such as a spring or the like is provided in the proximity of the elastic member connecting plate 910 to allow the elastic member connecting plate 910 to be connected thereto, and thus the second lever 900 receives an elastic restoring force to be restored to a state prior to being rotated through the elastic member in a state that the second lever 900 is rotated.

Hereinafter, the operation process of a withdrawable interlock device of a vacuum circuit breaker according to the present disclosure will be described in detail with reference to the accompanying drawings.

First, the second lever 900 in close contact with the rotating member 1200 rotates when the user rotates the rotating member 1200 in a state that he or she holds the handle portion 1230 of the rotating member 1200, and the fitting protrusion 1110 formed on the moving plate 1100 is fitted into the fitting groove 311a formed on the lateral plate 311 when the user pushes the moving control stopper 1120 to move the moving plate 1100 while at the same time rotating the second lever 900.

Here, as illustrated in FIGS. 6B, 8, 10 and 11A, when the control power plug 210 is coupled to the control power connector 110 to supply control power, the link 500 connected to the control power connector 110 moves downward, and the first lever 800 rotates upward while moving the link connector 600 according to the movement of the link 500.

When the first lever 800 rotates upward according to the coupling of the control power connector 110 to the control power plug 210, the second lever 900 rotated according to the rotation of the rotating member 1200 is located in contact with an outer surface of the first lever 800, thereby preventing the second lever 900 from being restored to an original position by the first lever 800.

Accordingly, when the second lever 900 is rotated to fit the fitting protrusion 1110 into the fitting groove 311a, and the control power connector 110 is coupled to the control power plug 210 to supply power, it becomes a state that the circuit breaker body 100 is unable to be separated from an inside of the cradle 300 to an outside thereof, thereby preventing an accident for the operator from being occurred as well as preventing the circuit breaker body 100 from being broken due to its electrical damage since the circuit breaker body 100 is separated to the outside while supplying control power.

Then, as illustrated in FIGS. 6A, 7, 9 and 11B, when the control power connector 110 is separated from the control power plug 210, the link 500 connected to the control power connector 110 moves upward, and As a result the link connector 600 connected thereto moves upward while at the same time rotating the first lever 800 downward.

When the first lever 800 rotates downward, a state in which the second lever 900 is in close contact with is released, and thus becomes a state that it is able to be restored to a position prior to the second lever 900 being rotated.

Here, when the second lever 900 is restored to a position prior to being rotated using the user's manipulation or an elastic restoring force of the elastic member, the other side of the second lever 900 and the moving control stopper 1120 are separated by a predetermined distance to move the moving plate 1100 in a direction in which the fitting protrusion 1110 is separated from the fitting groove 311a by a separation distance.

Accordingly, in a state that the control power connector 110 is separated from the control power plug 210, the control power connector 110 may be allowed to move to separate the fitting protrusion 1110 from the fitting groove 311a, thereby separating the circuit breaker body 100 from an inside of the cradle 300 to an outside thereof.

While the present invention has been described in terms of its preferred embodiments, various alternatives, modifications and equivalents will be apparent to those skilled in the art, and it is clear that the invention is applicable in the same manner by appropriately modifying the above embodiments. Accordingly, the disclosure is not intended to limit the scope of the invention as defined by the limitation of the following claims.

What is claimed is:

1. A withdrawable interlock device of a vacuum circuit breaker comprising a switchboard provided with a control power plug; a circuit breaker body provided with a control power connector detachably connected to the control power plug; a cradle inserted into the switchboard and a carriage moving within the cradle in a state that the circuit breaker body is mounted thereon, the withdrawable interlock device comprising:
a link configured to move according to whether the control power plug is attached to or detached from the control power connector;
a link connector connected to the link to move in linkage with movement of the link;
a first lever connected to the link connector to rotate by a first predetermined angle according to movement of the link connector;
a moving plate provided in the carriage to move; and
a second lever located between the link and the moving plate, and one side of which is located close to the first lever according to rotation by a second predetermined angle to limit rotation of the first lever or other side of which pushes the moving plate while at the same time releasing a close location between the one side and the first lever.

2. The withdrawable interlock device of claim 1, wherein an elastic member is provided within the cradle to be separated from the second lever by a predetermined distance, and an elastic member connecting plate is formed on an other side of an outer surface of the second lever to be connected to the elastic member, and when the second lever rotates along rotation of the rotating member the second lever receives an elastic restoring force to a position prior to being rotated through the elastic member while at the same time releasing a close location between the second lever and the first lever.

3. The withdrawable interlock device of claim 1, wherein a moving control stopper is provided on an inner surface of the moving plate to rotate in a state that an other side of an inner surface of the second lever is in close contact with the moving control stopper and push the moving control stopper so as to move the moving plate.

4. The withdrawable interlock device of claim 3, wherein a fixed plate is provided in proximity of the first lever, and a moving groove is formed on the fixed plate to rotate the second lever in a state that the second lever is fitted into the moving groove.

5. The withdrawable interlock device of claim 3, wherein a rotating control plate is located in contact with the first lever to limit a rotation of the second lever in a state that the first lever is rotated and is further formed on one side of an upper surface of the second lever.

6. The withdrawable interlock device of claim 3, wherein the link connector comprises an upper plate formed in a vertical direction to be connected to a lower portion of the link, a middle plate extended to the upper plate to be bent in a horizontal direction, and a lower plate extended to the middle plate to be bent in a vertical direction and formed with a rotating control groove, and the first lever comprises a front plate and a lateral plate formed perpendicular to a lateral surface of the front plate, and a fastening member passes through the rotating control groove in a state that the lateral plate is in close contact with an inner surface of the lower plate to rotate the first lever along movement of the link connector in a state that the first lever is connected to the link connector.

7. The withdrawable interlock device of claim 6, wherein the rotating control groove is formed such that a transverse diameter thereof is greater than a longitudinal diameter thereof.

8. The withdrawable interlock device of claim 6, wherein a first lever supporting member located in close contact with the lateral plate is provided adjacent to the lower plate, and a through hole is formed on the first lever supporting member, and an aperture is formed on the lateral plate at a position corresponding to the through hole, and a fastening member passes through the through hole and the aperture in a state that the first lever supporting member is in close contact with the lateral plate to rotate the first lever in a state that the first lever supporting member is fixed to the lateral plate.

9. The withdrawable interlock device of claim 1, wherein a base frame on which the circuit breaker body moves is provided in the cradle, and a lateral plate formed with a fitting groove is provided at first and second sides of the base frame, and a fitting protrusion is formed at one side of the moving plate, and thus the moving plate moves to fit the fitting protrusion into the fitting groove when the second lever rotates to release a close location between the one side of the second lever and the first lever, and the moving plate moves to separate the fitting protrusion from the fitting groove when the second lever rotates to allow the one side of the second lever to be close to the first lever.

10. The withdrawable interlock device of claim 9, wherein a rotating member is provided at an upper side of the moving plate, and the rotating member is formed with a horizontal plate and a vertical plate perpendicular to the horizontal plate, and the vertical plate is located in close contact with an other side of an outer surface of the second lever to rotate the rotating member in a state that the vertical plate is in close contact with the second lever so as to move the moving plate while at the same time rotating the second lever.

11. The withdrawable interlock device of claim 10, wherein a handle portion is further formed at one side of the horizontal plate.

* * * * *